(12) United States Patent
Park (10) Patent No.: US 9,678,763 B2
(45) Date of Patent: Jun. 13, 2017

(54) DISPLAY APPARATUS AND CONTROLLING METHOD THEREOF

(71) Applicant: SAMSUNG ELECTRONICS CO., LTD., Suwon-si (KR)

(72) Inventor: Sang-hyurk Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

(21) Appl. No.: 14/694,598

(22) Filed: Apr. 23, 2015

(65) Prior Publication Data

US 2015/0309806 A1    Oct. 29, 2015

(30) Foreign Application Priority Data

Apr. 23, 2014 (KR) .......................... 10-2014-0048680

(51) Int. Cl.
*G06F 9/44* (2006.01)
*H04N 21/441* (2011.01)
(Continued)

(52) U.S. Cl.
CPC ............ *G06F 9/4418* (2013.01); *G06F 9/442* (2013.01); *H04N 21/441* (2013.01);
(Continued)

(58) Field of Classification Search
CPC ........... H04N 21/812; H04N 21/25883; H04N 7/165; H04N 21/25891; H04N 21/4532;
(Continued)

(56) References Cited

U.S. PATENT DOCUMENTS

| 8,336,773 B2* | 12/2012 | Trimper ............. H04N 21/4126 235/382 |
| 8,629,940 B2* | 1/2014 | Daly ................ H04N 21/42204 348/14.05 |

(Continued)

FOREIGN PATENT DOCUMENTS

| EP | 1253777 A2 | 10/2002 |
| EP | 1942658 A2 | 7/2008 |
| EP | 2566178 A1 | 3/2013 |

OTHER PUBLICATIONS

Communication dated Aug. 14, 2015, issued by the European Patent Office in counterpart European Application No. 15163716.2.
Communication dated Oct. 22, 2015, issued by the European Patent Office in counterpart European Application No. 15163716.2.

*Primary Examiner* — Zahid Choudhury
(74) *Attorney, Agent, or Firm* — Sughrue Mion, PLLC (57) ABSTRACT

A display apparatus and a controlling method thereof are provided. The controlling method of a display apparatus includes receiving a power-off command through a control apparatus to control the display apparatus, storing image content information and identification information, the image content information being about an image content which is displayed by the display apparatus at a time at which the power-off command is input, and the identification information being about the control apparatus, in response to a power-on command being input, determining whether information included in the power-on command matches the stored identification information, and in response to the information included in the power-on command matching the stored identification information, displaying the stored image content information.

15 Claims, 8 Drawing Sheets

(51) Int. Cl.
*H04N 21/443* (2011.01)
*H04N 21/422* (2011.01)

(52) U.S. Cl.
CPC ....... *H04N 21/443* (2013.01); *H04N 21/4432* (2013.01); *H04N 21/42204* (2013.01)

(58) Field of Classification Search
CPC ............. H04N 5/4401; H04N 7/17318; H04N 21/235; H04H 60/27; H04H 60/13; G06F 9/44502; G06F 9/44514; G06F 9/44523; G06F 11/1417; G06F 9/44505
See application file for complete search history.

(56) References Cited

U.S. PATENT DOCUMENTS

| | | |
|---|---|---|
| 2002/0059588 A1 | 5/2002 | Huber et al. |
| 2004/0250294 A1* | 12/2004 | Kim ................... G11B 27/105 725/135 |
| 2006/0197676 A1 | 9/2006 | Smith |
| 2007/0192822 A1 | 8/2007 | White |
| 2010/0229194 A1* | 9/2010 | Blanchard ............... G06F 3/038 725/39 |
| 2011/0125298 A1* | 5/2011 | Epperson ............... G11B 19/02 700/94 |
| 2012/0224101 A1* | 9/2012 | Pouw ................. G05B 19/0426 348/554 |
| 2015/0301836 A1* | 10/2015 | Chung .................. G06F 9/4406 713/2 |

* cited by examiner

DISPLAY APPARATUS AND CONTROLLING METHOD THEREOF

CROSS-REFERENCE TO RELATED APPLICATION(S)

This application claims priority from Korean Patent Application No. 10-2014-0048680, filed in the Korean Intellectual Property Office, on Apr. 23, 2014, the disclosure of which is incorporated herein by reference.

BACKGROUND

1. Field

Apparatuses and methods consistent with exemplary embodiments relate to a display apparatus and a controlling method thereof, and more particularly, to a display apparatus which allows a user to control a booting mode of the display apparatus and for efficiently controlling a method thereof.

2. Description of the Related Art

Recently, various technologies for fast booting of a display apparatus have been introduced, and the number of such technologies is increasing.

General booting refers to an operation of turning off and turning on the power of an apparatus or a device to operate various application programs of a system while a normal operating system is booted and executed.

Recent electronic devices may use various types of booting modes such as a suspend to random access memory (RAM) mode, and an instant on mode which allows transition to an initialized state where the functions of a system can be executed within a few seconds after the system is turned on, and the like.

The instant on function enables fast booting of an electronic device system, however, when a user's command to turn on the system is input, content which had been displayed when a power-off command was input is displayed immediately.

For example, when the instant booting is performed, even if a user who inputs a power-off command is different from a user who inputs a power-on command, a content which was used by the previous user is displayed.

As a non-limiting example, when an adult uses content which should be watched by a person that has an age higher than that of a certain age, and then, turns off the power in an instant mode, the content may be exposed to a child if the child performs the instant booting.

Accordingly, provided is a technology for a display device to change its booting mode when a user of the display device has changed.

SUMMARY

An aspect of the exemplary embodiments relates to a display apparatus which may change a booting mode according to a user of the display apparatus in which an instant on function is available, and a controlling method thereof.

According to an aspect of an exemplary embodiment, there is provided a controlling method of a display device including receiving a power-off command through a control apparatus to control the display apparatus; storing image content information and identification information, the image content information being about an image content which is displayed by the display apparatus at a time at which the power-off command is input, and the identification information being about the control apparatus; in response to a power-on command being input, determining whether information included in the power-on command matches the stored identification information; and in response to the information included in the power-on command matching the stored identification information, displaying the stored image content information.

The determining may include, in response to the control apparatus being a Bluetooth remote controller, determining whether a unique ID of the Bluetooth remote controller or information regarding a connected channel when the Bluetooth remote controller is paired with the display apparatus is consistent with the stored identification information.

The method may further include transmitting instant boot information to the Bluetooth remote controller according to a result of the determination, the instant boot information indicating whether to perform instant booting, wherein in response to receiving the instant boot information, the Bluetooth remote controller outputs a first indicator if the instant booting is performed and a second indicator if the instant booting is not performed.

The determining may include, in response to the control apparatus being a mobile device, determining whether unique information of the mobile device is consistent with the stored identification information.

The determining may include, in response to the control apparatus being a remote controller which outputs a different frequency when a power button included in the control apparatus is input, determining whether the output frequency is consistent with the stored identification information.

The method may further include, in response to the information included in the power-on command not matching the stored identification information, displaying a predetermined screen.

The method may further include, in response to the information included in the power-on command not matching the stored identification information, transmitting, as the identification information, information that instant booting is not possible to the control apparatus.

According to an exemplary embodiment, there is provided a display apparatus including a display configured to display an image content; an input unit configured to receive a power-off command from a control apparatus, the power-off command for turning off the display apparatus; a storage; and a controller configured to: control the storage to store image content information and identification information, the image content information being about an image content which is displayed by the display apparatus at a time when the power-off command is input, and the identification information being about the control apparatus, determine, in response to a power-on command being input, whether information included in the power-on command matches the stored identification information, and display, in response to the information included in the power-on command matching the stored identification information, the stored image content information.

The controller, in response to the control apparatus being a Bluetooth remote controller, may determine whether a unique ID of the Bluetooth remote controller or information regarding a connected channel when the Bluetooth remote controller is paired with the display apparatus is consistent with the stored identification information.

The controller may control to transmit instant boot information regarding whether to perform instant booting to the Bluetooth remote controller according to a result of the determination, and in response to receiving the instant boot information, outputs a first indicator if the instant booting is performed and a second indicator if the instant booting is not performed.

The controller, in response to the control apparatus being a mobile device, may determine whether unique information of the mobile device is consistent with the stored identification information.

The controller, in response to the control apparatus being a remote controller which outputs a different frequency when a power button included in the control apparatus is input, may determine whether the output frequency is consistent with the stored identification information.

The controller, in response to the information included in the power-on command not matching the stored identification information, may control to display a predetermined screen.

The controller, in response to the information included in the power-on command not matching the stored identification information, may control to transmit information that instant booting is not possible as the identification information does not match, to the control apparatus.

According to the above-described various exemplary embodiments, a booting mode may be changed according to a user who uses a display apparatus.

BRIEF DESCRIPTION OF THE DRAWINGS

The above and/or other aspects will be more apparent by describing certain exemplary embodiments of the present inventive concept with reference to the accompanying drawings, in which.

DETAILED DESCRIPTION

Hereinafter, various exemplary embodiments are described in greater detail with reference to accompanying drawings. In the exemplary embodiments, if the detailed description of a known feature or a configuration in the related art are believed to unnecessarily obscure the gist of the exemplary embodiment, the detailed description thereof may not be provided. The terms which are described herein are defined in consideration of the feature of an exemplary embodiment, and the definition of the terms may vary depending on the intention or practice of a user and an operator. Accordingly, the definition of the terms shall be considered based on the content of this specification overall.

Figure 1:
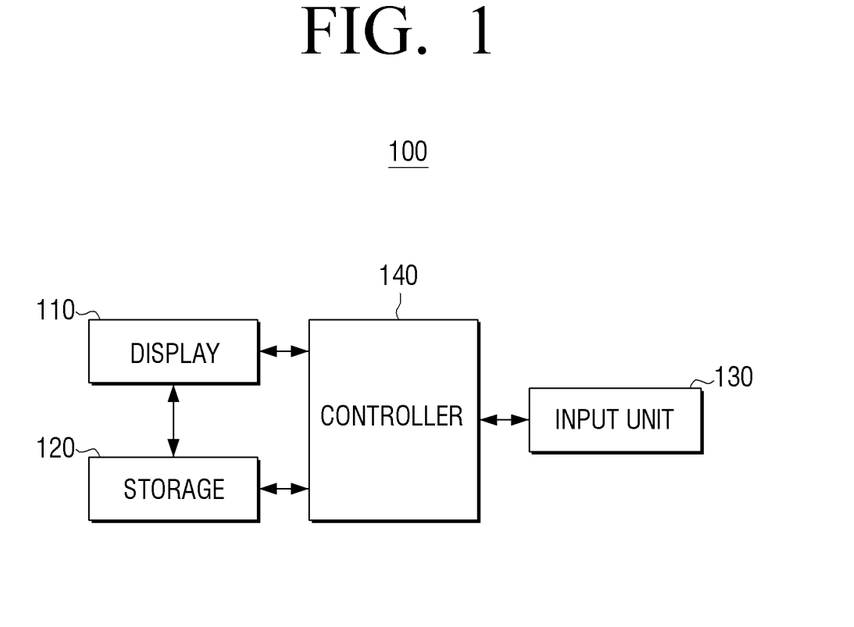
FIG. 1 is a block diagram illustrating a display apparatus according to an exemplary embodiment.

FIG. 1 is a block diagram illustrating a display apparatus according to an exemplary embodiment. As illustrated in FIG. 1, a display apparatus includes a display 110, a storage 120, an input unit 130, and a controller 140. For example, the display apparatus 100 may be a TV, but this is merely for purposes of example. The display apparatus 100 may also be various electronic apparatuses with the display 110, such as a mobile phone, a tablet PC, a digital camera, a camcorder, a notebook PC, a PDA, and the like.

The display 110 may display an image. For example, the display 110 may display content that is received through a broadcast channel. In this example, the display apparatus 100 may receive various broadcast signals that are transmitted from a broadcasting station via an RF communication network, and may receive content from various servers via an IP network. Accordingly, the display 110 may display the received content.

The storage 120 stores various modules to drive the display apparatus 100. For example, the storage 120 may store software including a base module, a sensing module, a communication module, a presentation module, a web browser module, a service module, and the like. For example, the base module may refer to a basic module which processes a signal transmitted from hardware that is included in the display apparatus 100, and transmits the processed signal to an upper layer module. The sensing module is a module which collects information from various sensors, and analyzes and manages the collected information. For example, the sensing module may include a face recognition module, a voice recognition module, a motion recognition module, a near field communication (NFC) recognition module, and the like. The presentation module may be used to compose a display screen. For example, the presentation module may include a multimedia module for reproducing and outputting multimedia contents, and a UI rendering module for UI and graphic processing. The service module may include various applications for providing various services.

For example, the storage 120 may include various program modules, and some of the various program modules may be omitted or changed, or other program modules may be added according to a type and characteristics of the display apparatus 100. For example, if the above-described display apparatus 100 is a smart phone, the base module may further include a location determination module to determine a Global Positioning System (GPS)-based location, and the sensing module may further include a sensing module to sense the operations of a user.

Accordingly, if the display apparatus 100 operates in an instant on mode, the storage 120 may store information about an image content at the point of time when a power-off command to turn off the power of the display apparatus is input.

The instant on mode may refer to a mode in which instant booting is performed when a user command to turn on the power of the display apparatus 100 is input. For example, the instant booting allows a transition to an initialized state in which the functions of a system can be executed within a few seconds after the system of the apparatus is turned on.

Accordingly, if power of the display apparatus 100 is turned off in the instant on mode, and a user command to turn on the power of the display apparatus 100 is input, the display apparatus 100 may display a display screen at a time of turning off the power of the display apparatus 100.

For example, the display apparatus 100 may store the state of a hardware drive at a time at which the power of the display apparatus 100 is turned off in the storage 120, such as a dynamic random access memory (DRAM), so that a standby mode such as suspend to RAM and/or suspend to disk or an instant on mode can be used. Accordingly, the display apparatus 100 may preserve the contents that are stored in the storage 120 such as a DRAM using a self-refresh operation of a double data rate (DDR) memory of the storage 120 in a suspended state. In addition, if a user command to turn on the power of the display apparatus 100 is input from a user, the operation state prior to the power being turned off may be preserved quickly.

Further, the storage 120 may store identification information of a control apparatus that transmits a power-off command.

For example, if the control apparatus is a Bluetooth remote controller, a unique ID of the Bluetooth remote controller or information about a channel connected to the display apparatus 100 may be stored.

For example, if the control apparatus is a mobile device such as a mobile phone, the storage 120 may store unique information of the mobile device. For example, the storage 120 may store information such as media access control (MAC) address of the mobile phone.

If the control apparatus is a remote controller, the storage 120 may store a frequency that is received from a remote controller. In an example of an infra-red (IR) remote controller, the storage 120 may store a frequency regarding an IR signal. In other words, the remote controller may include a separate instant mode button in addition to a power button. For example, the frequency transmitted from the remote controller when the instant mode button is pressed is different from the frequency transmitted from the remote controller when the power button is pressed. Accordingly, if the instant mode button is pressed so that the frequency associated with the instant mode button is transmitted to the display apparatus 100 to turn off the power, the storage 120 may store the frequency which is transmitted when the instant mode button is pressed.

If the frequency which is transmitted when the power button is pressed is different depending on remote controllers, the storage 120 may store a frequency that is transmitted from the remote controller.

Meanwhile, the input unit 130 receives a user command. For example, the input unit 130 receives a user command to control the overall operations of the display apparatus 100 through a control apparatus. For example, the input unit 130 may receive a user command to turn on/off the power of the display apparatus 100. In this example, the input unit 130 may receive a power-off command through a control apparatus to control the display apparatus 100.

In this example, the control apparatus may be a remote controller including four direction keys correspond to up, down, left, and right directions, and an enter key. The control apparatus may be a Bluetooth remote controller including a Bluetooth module, but this is merely for purposes of example. The control apparatus may be various input apparatuses such as a mobile device like a mobile phone, a touch screen, a mouse, a pointing device, and the like.

If the input unit 130 receives a user command through a Bluetooth remote controller or a remote controller, the control apparatus may include an instant on/off button that causes the apparatus to perform instant on booting in addition to a power button. As another example, the control apparatus may include a separate button for cold booting rather than for instant booting.

The controller 140 controls the overall operations of the display apparatus 100. For example, if the display apparatus 100 operates in an instant on mode, and a power-off command is input through the user input unit 130, the controller 140 may control the storage 120 to store information about an image content displayed by the display apparatus at the time while the power-off command is input.

For example, if a power-off command is input through a separate control apparatus, the controller 140 may control the storage 120 to store identification information of the control apparatus. Subsequently, when a power-on command is input, the controller 140 may determine whether the identification information of the control apparatus through which the power-on command is input, matches the identification information stored in the storage 120. However, depending on the matching result, the controller 140 may determine whether to perform instant booting.

For example, if it is determined that the stored identification information of the control apparatus through which the power-off command is input matches the identification information of the control apparatus through which the power-on command is input, the controller 140 may perform an instant booting. Accordingly, the display apparatus 100 may display an image content which has been displayed when the power-off command was input.

As another example, if it is determined that the stored identification information of the control apparatus through which the power-off command is input does not match the identification information of the control apparatus through which the power-on command is input, the controller 140 may cause the display apparatus 100 to cold boot. In this example, the controller 140 may cause the display 110 to display a predetermined screen (e.g., a predetermined initial screen). In addition, the controller 140 may cause the display 110 to display a user interface (UI) informing a user that instant booting cannot be performed for a predetermined time just before the predetermined screen is displayed. The predetermined time may be a short time, for example, less than one second.

The controller 140 may control to transmit information about a matching result between the information included in the power-on command and the stored identification information, to the control apparatus.

For example, the control apparatus often includes an indicator such as a display, an oscillation module, a light emitter like a Light-Emitting Diode (LED), and the like. Accordingly, in order to let a user know the booting state through an indicator included in the control apparatus, the controller 140 may control to transmit information about whether to perform instant booting to the control apparatus 200.

For example, if the control apparatus 200 is a Bluetooth remote controller, the controller 140 may transmit the matching result to the Bluetooth remote controller. In this example, the Bluetooth remote controller may display an indicator to show the received matching result. For example, the Bluetooth remote controller may display the matching result, that is, whether to perform instant booting or cold booting, on its display. If the instant booting is to be performed, the Bluetooth remote controller may cause an LED included in the remote controller to emit light or oscillate.

Figure 2:
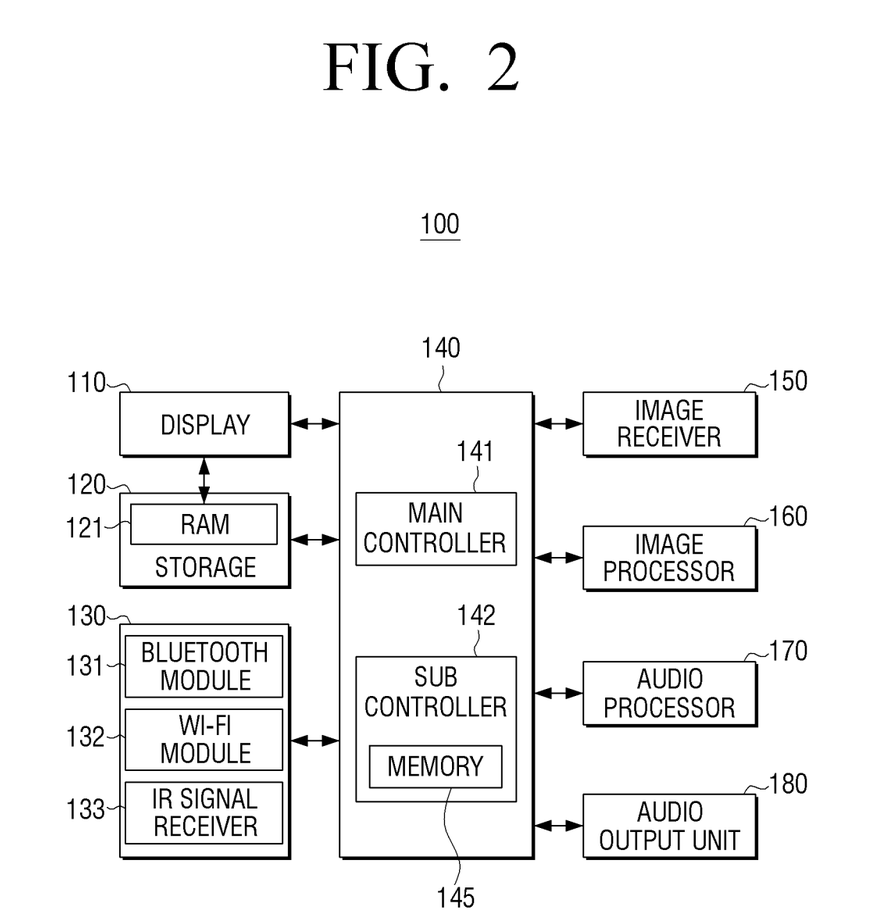
FIG. 2 is a block diagram illustrating a display apparatus according to another exemplary embodiment.

Hereinafter, an example of the configuration of the display apparatus 100 is described in greater detail with reference to FIG. 2. FIG. 2 is a block diagram illustrating the display apparatus 100 according to another exemplary embodiment. As illustrated in FIG. 2, the display apparatus 100 may include the display 110, the storage 120, the input unit 130, the controller 140, an image receiver 150, an image processor 160 (e.g., a video processor), an audio processor 170, and an audio output unit 180.

The display 110 displays an image. For example, the display 110 may display content received through a broadcast channel. As an example, the display 110 may display at least one of a video frame which is generated from processed image data received from the image receiver 150 and various screens generated by a graphic processor (not shown).

The display 110 may display an operating system driving screen and an application program screen of the display apparatus 100. For example, the display 110 may display a predetermined initial screen when the power of the display apparatus 100 is applied, an execution screen when an application program is selected, and the like.

If instant booting is not available, the display 110 may display a UI indicating that cold booting is to be performed because instant booting is not available.

The storage 120 may store various modules to drive the display apparatus 100. In addition, the storage 120 may include a separate storage such as a RAM 121. Accordingly, if the display apparatus 100 operates in an instant on mode, the storage 120 may store, in the RAM 121, information about an image content which is displayed in the display apparatus at the time when a power-off command to turn off the power of the display apparatus 100 is input.

In other words, the display apparatus 100 stores the state of a hardware drive at a time that the power of the display apparatus 100 is turned off in the storage 120 (e.g., DRAM) so as to use a standby mode such as suspend to RAM and suspend to disk or an instant on mode. Accordingly, the display apparatus 100 may preserve the contents that are stored in the storage 120 using a self-refresh operation of a DDR memory of the storage 120 in a suspended state.

In addition, if a user command to turn on the power of the display apparatus 100 is input, the operation state before turning off the power may be preserved quickly, for example, before a predetermined amount of time.

For example, if a user command to turn on the power of the display apparatus 100 is input, an initial screen may be configured and displayed using the stored operation state of the display apparatus 100 (for example, a connection URL of channel information or a selected external apparatus, and the like, of an image content at the time when a power-off command is input) at the time when a power-off command was input. Accordingly, when a user command to turn off the power is input, the display apparatus 100 may display the screen which had been displayed when a power-off command was input.

As another example, if the power of the display apparatus 100 is turned on as described in the examples above, the storage 120 may receive not only information for preserving the operation state before a power-off command is input but also identification information of a control apparatus which received the power-off command.

For example, if the control apparatus is a Bluetooth remote controller, a unique ID of the Bluetooth remote controller or information about a channel connected to the display apparatus 100 may be stored. For example, if a user command of pressing a power button included in the Bluetooth remote controller is input while the power of the display apparatus 100 is turned on, the display apparatus 100 may receive a power-off command and the ID of the Bluetooth remote controller through the input unit 130. In this example, the storage 120 may store the ID of the Bluetooth remote controller under the control of the controller 140. In addition, the storage 120 may store information about a channel connected to the display apparatus 100 by the Bluetooth remote controller.

If the control apparatus is a remote controller, the storage 120 may store a frequency that is received from a remote controller. In other words, the remote controller may include a separate instant mode button in addition to a power button. In this example, the frequency which is transmitted from the remote controller when the instant mode button is pressed may be different from the frequency which is transmitted from the remote controller when the power button is pressed. Accordingly, if a user command to press the instant mode button is input and the frequency which is transmitted when the instant mode button is pressed is transmitted to the display apparatus 100 causing the power to turn off, and the storage 120 may store the frequency which is transmitted when the instant mode button is pressed.

For example, because the frequency which is generated when the power button is pressed may be different depending on remote controllers, the storage 120 may store a frequency that is transmitted from the remote controller.

The above-described identification information may be stored in a storage such as the RAM 121 that is included in the storage 120.

Meanwhile, the input unit 130 may receive a user command. The input unit 130 may receive a user command to control the overall operations of the display apparatus 100. For example, the input unit 130 may receive a user command to turn on/off the power of the display apparatus 100. For example, the input unit 130 may receive a power-off command through a control apparatus to control the display apparatus 100.

In this example, the control apparatus may be a remote controller including four direction keys corresponding to up, down, left, and right directions, and an enter key, or a Bluetooth remote controller more including a Bluetooth module, but this is only for purposes of example. The control apparatus may be various input apparatuses such as a mobile device like a mobile phone, a touch screen, a mouse, a pointing device, and the like.

In addition, the input unit 130 may include a Bluetooth module 131, a Wi-Fi module 132, and an IR signal receiver 133. However, this is only an example, and it should be appreciated that the input unit 130 may not include some of the elements or may further include other elements depending on how the display apparatus 100 receives a control command.

The Bluetooth module 131 is an element to use a wireless transmission technology between external electronic apparatuses of the display apparatus 100 (for example, a mobile phone or a PC). For example, if the input unit 130 receives a user command through a Bluetooth remote controller, the Bluetooth module 131 may receive the user command and the ID of the Bluetooth remote controller.

Also, the Wi-Fi module 132 may use a near field communication that provides wireless Internet using an electric wave and the like at a place where an Access Point (AP) is installed through the display apparatus 100. Accordingly, if a control apparatus is connected to the display apparatus 100 using Wi-Fi communication, the Wi-Fi module 132 may receive a user command which is input through the control apparatus. For example, the Wi-Fi module 132 may receive unique identification information of the control apparatus.

For example, the IR signal receiver 133 may receive an IR signal when the control apparatus is an apparatus using an IR signal just like an IR remote controller.

If the input unit 130 is a Bluetooth remote controller or a remote controller, an instant mode button to turn on/off an instant mode may be included in addition to a power button.

The input unit 130 such as a remote controller may include a separate button for requesting cold booting instead of instant booting.

Meanwhile, the controller 140 may include a main controller 141 and a sub controller 142.

For example, the main controller 141 may control the overall operations of the display apparatus 100. The main controller 141 may determine whether the display apparatus 100 operates in an instant on mode. If a power-off command is input through a control apparatus, the main controller 141 may control the storage 120 in order to store information about image content which has been or which is being displayed on the display apparatus when a power-off command is input to a storage such as the RAM 121.

In addition, the main controller 141 may control the control apparatus to receive and store the identification information of the control apparatus. In other words, the main controller 141 may also control the control apparatus to store the identification information in a separate storage such as the RAM 121.

If a power-off command is input in an instant on mode, the display apparatus 100 may apply power to the sub controller 142, some communication modules such as a Bluetooth module and the RAM 121, and may cut off power to the other elements of the display apparatus 100.

If the sub controller 142 includes a separate internal memory 145 and a power-off command is input while in an instant on mode, the display apparatus 100 may apply power to the sub controller 142, the memory 145 of the sub controller 142, and communication modules such as a Bluetooth module, and RAM 121, and may cut off power to the other elements of the display apparatus 100.

Accordingly, the sub controller 142 may store the identification information of a control apparatus, which is input while a power-off command is input. For example, the sub controller 142 may store the identification information in a storage such as the RAM 121, and store the identification information in the memory 145 of the sub controller 142.

If a user command to turn on the display apparatus 100 is input after the display apparatus 100 is turned off in an instant mode, the sub controller 142 may apply power to the main controller 141. Subsequently, the main controller 141 may determine whether identification information that is input with a power-on command matches pre-stored identification information, and may control a booting mode according to the matching result.

As another example, the sub controller 142 may determine whether identification information which is input through a user command to turn on the display apparatus 100 matches identification information which is pre-stored in the separate memory 145 of the sub controller 142. The sub controller 142 may transmit a signal for performing the instant booting or cold booting to the main controller 141 according to the matching result. For example, the main controller 141 may control a booting mode according to a signal which is received according to the result of the determination by the sub controller 142.

For example, if a signal for performing instant booting is received from the sub controller 142, the main controller 141 may perform instant booting using information about a content, which is stored in a storage such as the RAM 121.

Also, the image receiver 150 may receive image data through various sources. For example, the image receiver 150 may receive broadcast data from an external broadcasting station, receive image data from an external server, in real time, and receive image data stored in the internal storage 120.

Also, the image processor 160 may process image data received from the image receiver 150. For example, the image processor 160 may perform various image processing with respect to image data, such as decoding, scaling, noise filtering, frame rate conversion, resolution conversion, and the like.

The audio processor 170 may process audio data. For example, the audio processor 170 may perform various processing with respect to audio data, such as decoding, amplification, noise filtering, and the like. The audio data that is processed by the audio processor 240 may be output to the audio output unit 180.

The audio output unit 180 may output not only various audio data processed by the audio processor 170 but also various alarm sounds, voice messages, and the like. For example, the audio output unit 180 may be a speaker, but this is only an example. As another example, the audio output unit may be an audio terminal.

As described in the above examples, if a user of a display apparatus is changed, or a control apparatus for controlling the display apparatus is changed, the user may more easily use a changed booting mode.

Hereinafter, an example of a method of determining whether to change a booting mode in the display apparatus 100 is described with reference to FIGS. 3 to 7.

Figure 3:
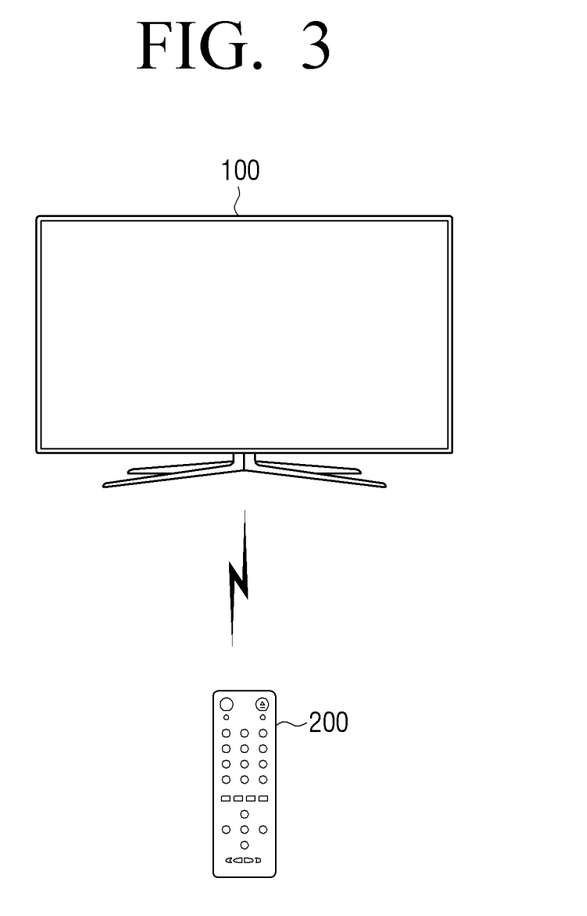
FIG. 3 is a view illustrating a display apparatus and a control apparatus according to an exemplary embodiment.

FIG. 3 is a view illustrating an exemplary embodiment of controlling a display apparatus 100 using a control apparatus 200 such as a Bluetooth remote controller.

Referring to FIG. 3, the control apparatus 200 may be a remote controller such as a Bluetooth remote controller or an infrared (IR) remote controller, but this is only an example. The control apparatus 200 may be realized as various input apparatuses such as a mobile device like a mobile phone, a touch screen, a mouse, a pointing device, etc.

The display apparatus 100 may receive a command to turn on/off the power through the control apparatus 200.

For example, if the control apparatus 200 is a Bluetooth remote controller, the display apparatus 100 may receive a control command using Bluetooth communication. For example, if a control command to turn off the power is input through a Bluetooth remote controller, the display apparatus 100 may receive a different Bluetooth ID depending on Bluetooth remote controllers. Accordingly, the display apparatus 100 may store the Bluetooth ID in a storage, such as the RAM 121, or a storage medium included in the sub controller 142 in which power may be applied continuously even though the power of the display apparatus 100 is turned off.

In addition, the display apparatus 100 may store information about a channel which is connected when a Bluetooth remote controller is paired with the display apparatus 100. For example, the channel information of a Bluetooth remote controller may also be stored in a storage such as the RAM 121 or a storage medium included in the sub controller 142 in which power is applied continuously even if the power of the display apparatus 100 is turned off.

Meanwhile, if the control apparatus 200 is a mobile device such as a mobile phone, the display apparatus 100 may receive a control command using a Wi-Fi communication. For example, if a control command to turn off the power is input through a mobile device, the display apparatus 100 may receive unique information about the mobile device, such as a media access control (MAC) address. Accordingly, the display apparatus 100 may store the unique information in a storage such as the RAM 121 or a storage medium included in the sub controller 142 in which power is applied continuously even if the power of the display apparatus 100 is turned off.

If the control apparatus 200 transmits an IR signal similar to or just as an IR remote controller, the display apparatus 100 may store an IR signal which is received while a power-off command is input. For example, the display apparatus 100 may include a separate on/off button to perform instant booting. Accordingly, the display apparatus 100 may store an IR signal which is transmitted according to a user command of pressing an instant on/off button in a storage such as the RAM 121 or a storage medium included in the sub controller 142 in which power may be applied continuously even if the power of the display apparatus 100 is turned off.

For example, the IR signal which is transmitted according to the user command of pressing a power button may be different depending on IR remote controllers. Accordingly, the control apparatus 200 may store a received IR signal as identification information of an IR remote controller.

Figure 4:
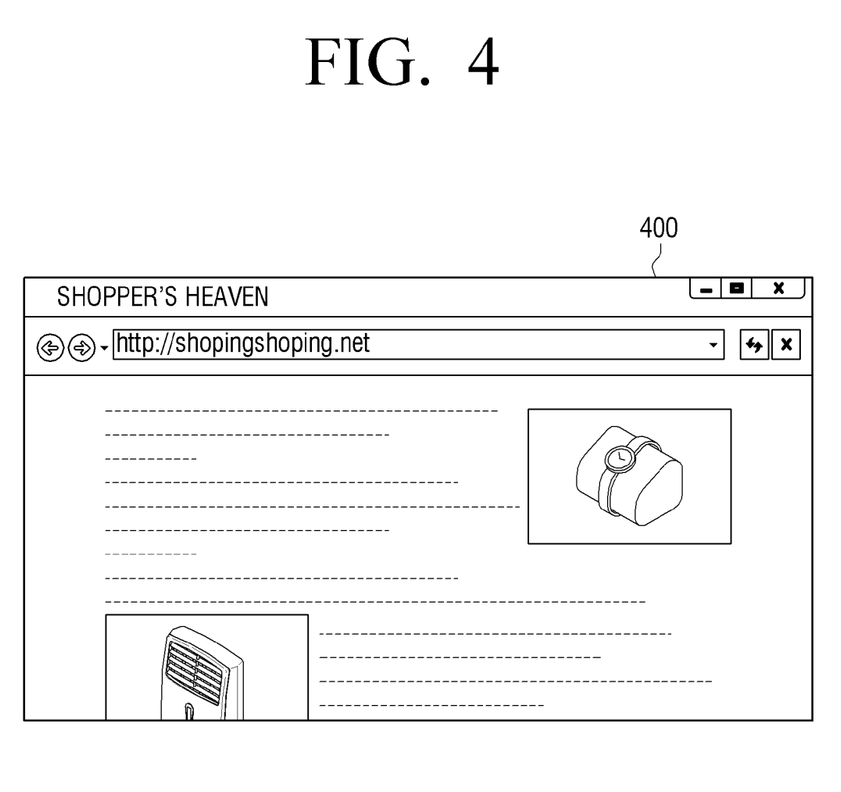
FIG. 4 is a view illustrating a display screen of a display apparatus according to an exemplary embodiment.

As illustrated in FIG. 4, if a power-off command is input through the control apparatus 200 while the display apparatus 100 is displaying a web browser screen, the display apparatus 100 which operates in an instant mode may turn off the elements, for example, except for the sub controller 142, the RAM 121, the input unit 130, and the like.

For example, the control apparatus 200 may be a Bluetooth remote controller. In this example, the display apparatus 100 may receive a power-off command and an ID of the Bluetooth remote controller. Accordingly, the display apparatus 100 may store the ID of the Bluetooth remote controller and turn off the power.

If a power-on command is input through the Bluetooth remote controller while the power is turned off, the display apparatus 100 may receive the power-on command and an ID of the Bluetooth remote controller. For example, the display apparatus 100 may determine whether a stored ID of the Bluetooth remote controller is the same as that of the ID of the Bluetooth remote controller, which is received along with the power-on command.

If it is determined that the stored ID of the Bluetooth remote controller is the same as that of the ID of the Bluetooth remote controller which is received along with the power-on command, the display apparatus 100 may perform instant booting. Accordingly, if the power is turned on, the display apparatus 100 may display a screen which is the same as that of a display screen 400 when the power-off command was input.

Figure 5:
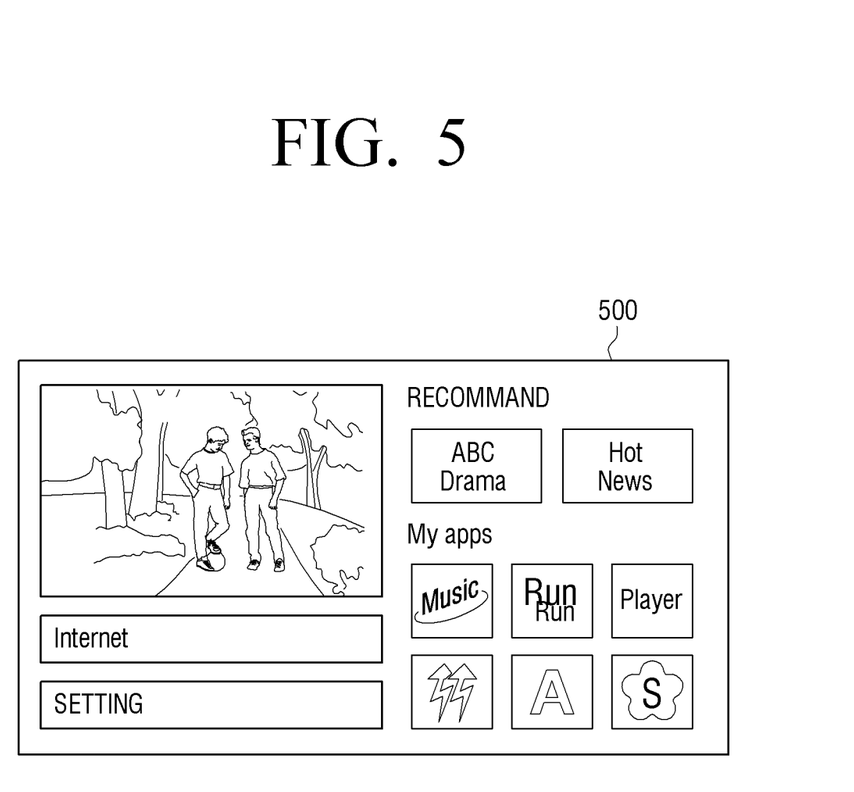
FIG. 5 is a view illustrating an initial screen of a display apparatus according to an exemplary embodiment.

As another example, if it is determined that the stored ID of the Bluetooth remote controller is not the same as the ID of the Bluetooth remote controller, which is received along with the power-on command, the display apparatus 100 may perform cold booting. For example, the display apparatus 100 may display a predetermined screen. The predetermined screen may be an initial screen 500 as illustrated in the example of FIG. 5.

Figure 6:
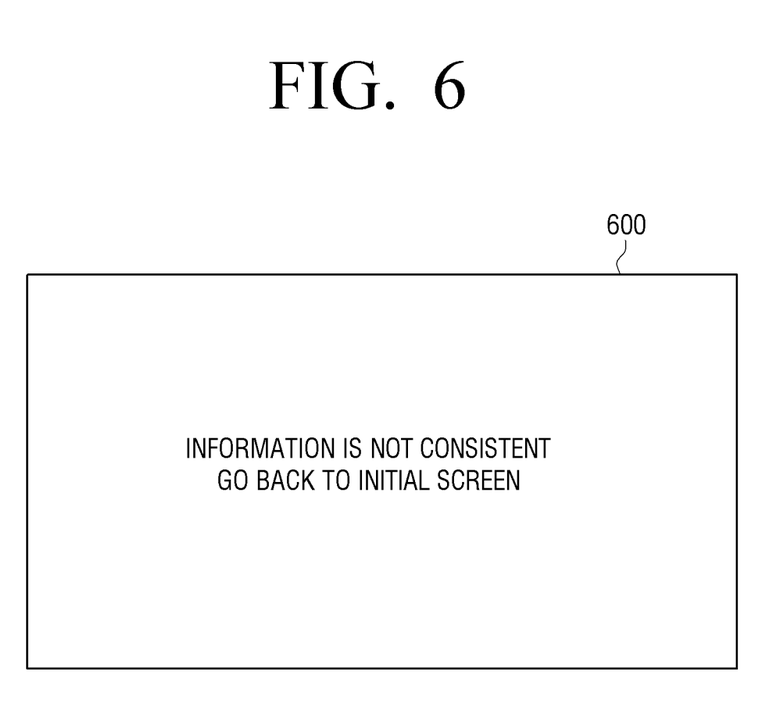
FIG. 6 is a view illustrating a guidance message that is output on a screen of a display apparatus according to an exemplary embodiment.

In addition, the display apparatus 100 may display a UI 600 indicating that cold booting is to be performed because identification is not consistent as illustrated in FIG. 6 for a predetermined period of time before displaying the initial screen 500. For example, the predetermined period of time may be a short time, for example, less than one second, and the like.

Meanwhile, the display apparatus 100 may store information about a connected channel when a Bluetooth remote controller is paired with the display apparatus 100. For example, if a power-on command is input through a Bluetooth remote controller while the display apparatus is turned off, the display apparatus 100 may receive the power-on command and channel information regarding the Bluetooth remote controller. Accordingly, the display apparatus 100 may determine whether the channel information of the Bluetooth remote controller is consistent with the stored identification information, and control a booting mode.

In addition, the display apparatus 100 may transmit information about whether to perform instant booting to a control apparatus. For example, the display apparatus 100 may transmit a matching result to a Bluetooth remote controller. In this example, the display apparatus 100 may transmit a matching result to a Bluetooth remote controller through Bluetooth communication.

For example, the Bluetooth remote controller may display an indicator for indicating the received matching result. For example, The Bluetooth remote controller may display a matching result, that is, an indication as to whether to perform instant booting or cold booting, on its display. If instant booting is to be performed, the Bluetooth remote controller may cause an LED included in the remote controller to emit light or to oscillate. As another example, if instant booting is not to be performed, the Bluetooth remote controller may also cause an LED included in the remote controller to emit light or to oscillate.

Figure 7:
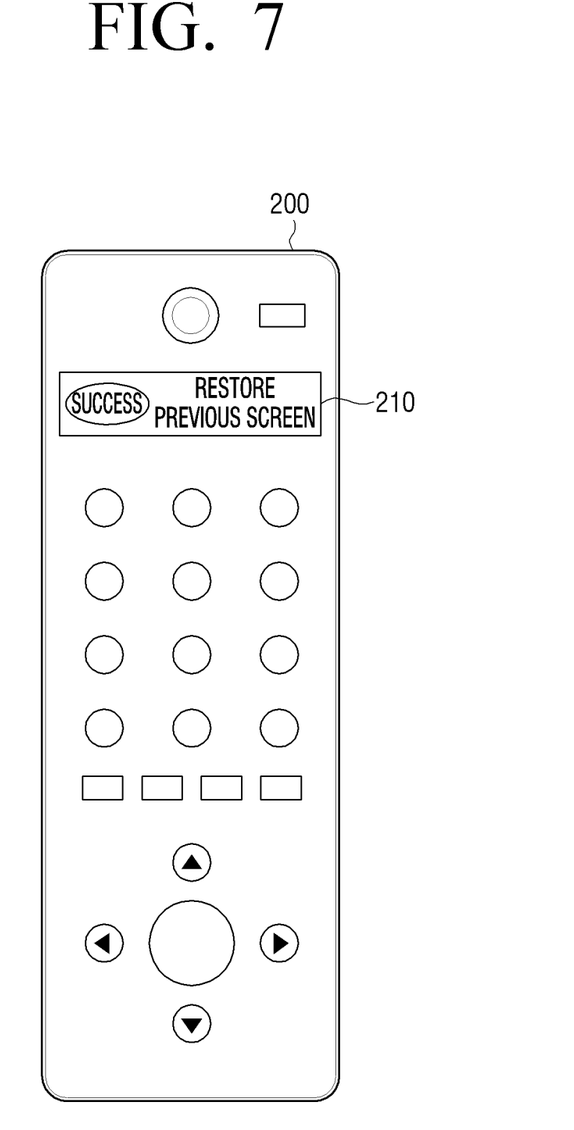
FIG. 7 is a view illustrating an indicator output screen of a control apparatus according to an exemplary embodiment.

FIG. 7 is a view illustrating an example of an indicator and illustrates a display screen when instant booting is performed.

In other words, if a display 210 is included in the control apparatus 200, the control apparatus 200 may control the display 210 to receive and display information about whether to perform instant booting.

According to the above-described exemplary display apparatus, if a user of a display apparatus changes, or a control apparatus for controlling the display apparatus changes, the user may more easily use a changed booting mode.

Figure 8:
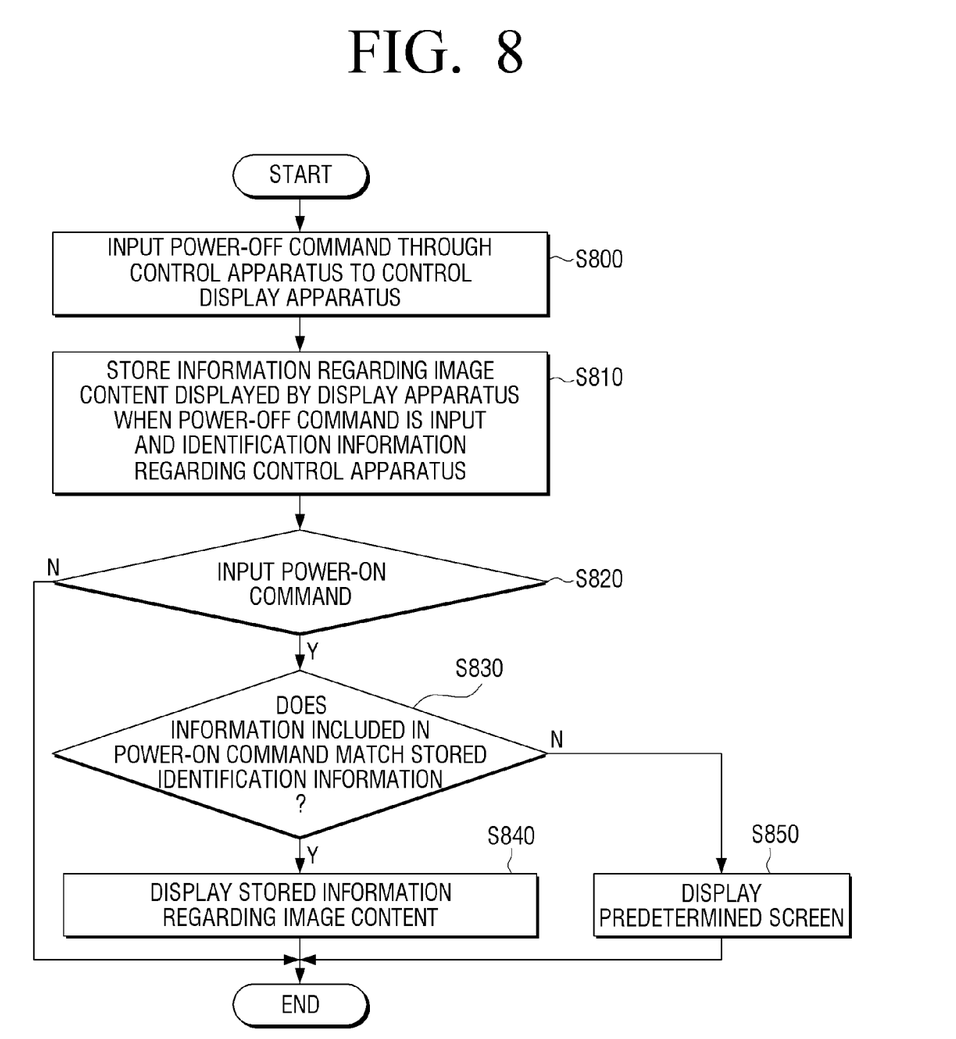
FIG. 8 is a flowchart illustrating a control method of a display apparatus according to an exemplary embodiment.

FIG. 8 is a flowchart illustrating a method of controlling a display apparatus according to an exemplary embodiment.

Referring to FIG. 8, the display apparatus 100 receives a power-off command through the control apparatus 200 for controlling the display apparatus 100 (S800). In this case, the control apparatus may be realized as a remote controller including a four direction keys in the up, down, left, and right directions, and an enter key, or a Bluetooth remote controller including a Bluetooth module, but this is only an example. The control apparatus may be realized as various input apparatuses such as a mobile device like a mobile phone, a touch screen, a mouse, a pointing device, etc.

The display apparatus 100 stores information regarding an image content which is displayed by the display apparatus 100 at the time when a power-off command is input and identification information of a control apparatus (S810).

Specifically, if the control apparatus is a Bluetooth remote controller, the display apparatus 100 may store unique ID of the Bluetooth remote controller or information regarding a connected channel when the Bluetooth remote controller is paired with the display apparatus 100.

If the control apparatus is a mobile device, the display apparatus 100 may store unique information of the mobile device. For example, if the control apparatus is a mobile phone, the display apparatus 100 may store information such as Mac address of the mobile phone.

If the control apparatus is a remote controller, the display apparatus 100 may store a frequency received from the remote controller. In other words, the remote controller may include a separate instant mode button in addition to a power button. The frequency which is transmitted from the remote controller when the instant mode button is pressed is different from the frequency which is transmitted from the remote controller when the power button is pressed. Accordingly, if a user command to press the instant mode button is input and the frequency which is transmitted when the instant mode button is pressed is transmitted to the display apparatus 100, turning off the power, the display apparatus 100 may store the frequency which is transmitted when the instant mode button is pressed.

If the frequency which is transmitted when the power button is pressed is different depending on remote controllers, the display apparatus 100 may store a frequency transmitted from the remote controller.

If a power-on command is input in the display apparatus 100 (S820—Y), the display apparatus 100 determines whether information included in the power-on command matches stored identification information (S830). In other words, the display apparatus 100 may receive identification information of the control apparatus which receives the power-on command along with the power-on command. Accordingly, the display apparatus 100 may determine whether the stored identification information matches the identification information which is received along with the power-on command.

If it is determined that the stored identification information matches the identification information which is received along with the power-on command (S830—Y), the display apparatus 100 displays stored information regarding an image content (S840). In other words, the display apparatus 100 may perform instant booting, and display the image content which had been displayed when a power-off command was input.

Meanwhile, if the stored identification information does not match the identification information which is received along with the power-on command (S830—N), the display apparatus 100 displays a predetermined screen (S850). In other words, the display apparatus 100 may perform cold booting. Accordingly, the display apparatus 100 may display a predetermined initial screen for cold booting. In addition, the display apparatus 100 may display a User Interface (UI) informing that instant booting cannot be performed for a predetermined time just before the predetermined screen is displayed. The predetermined time may be a short time, for example, less than one second.

The controlling method of a display apparatus according to the above-described various exemplary embodiments may be coded as software and stored in a non-transitory readable medium. The non-transitory readable medium may be mounted and used in various apparatuses.

For example, the non-transitory recordable medium refers to a medium which may store data permanently or semi-permanently rather than storing data for a short time such as a register, a cache, and a memory, and may be readable by an apparatus. For example, the non-transitory readable medium may be a CD, a DVD, a hard disk, a Blu-ray disk, a USB, a memory card, a ROM, and the like.

The foregoing embodiments and advantages thereof are merely exemplary and are not to be construed as limiting the present invention. For example, the present teachings can be readily applied to other types of apparatuses. Also, the description of the exemplary embodiments are intended to be illustrative, and not to limit the scope of the claims, and many alternatives, modifications, and variations may be apparent to those skilled in the art.

What is claimed is:

1. A controlling method of a display device, the method comprising:
   receiving a power-off command;
   storing image content information about an image content which is displayed on the display device at a time at which the power-off command is input, and device identification information of a control apparatus which transmits the power-off command to the display device;
   in response to a power-on command being input, determining whether device identification information of a control apparatus which transmits the power-on command to the display device, matches the stored device identification information;
   in response to the device identification information associated with the power-on command matching the stored device identification information associated with the power-off command, displaying an image based on the stored image content information; and
   in response to the device identification information associated with the power-on command not matching the stored device identification information associated with the power-off command, displaying an image corresponding to a predetermined content.

2. The method as claimed in claim 1, wherein the control apparatus is a Bluetooth remote controller, and
   the determining comprises determining whether a unique ID of the Bluetooth remote controller or information regarding a connected channel when the Bluetooth remote controller is paired with the display device is consistent with the stored device identification information.

3. The method as claimed in claim 2, further comprising:
   transmitting instant boot information to the Bluetooth remote controller according to a result of the determination, the instant boot information indicating whether instant booting is to be performed,
   wherein in response to receiving the instant boot information, the Bluetooth remote controller outputs a first indicator if the instant booting is performed and a second indicator if the instant booting is not performed.

4. The method as claimed in claim 1, wherein the control apparatus is a mobile device, and
   the determining comprises determining whether unique information of the mobile device is consistent with the stored device identification information.

5. The method as claimed in claim 1, wherein the control apparatus is a remote controller which outputs a certain frequency when an input of a power button included in the control apparatus is received, and
   the determining comprises determining whether the output frequency is consistent with the stored device identification information.

6. The method as claimed in claim 1, further comprising:
   in response to the device identification information associated with the power-on command not matching the stored device identification information associated with the power-off command, displaying a predetermined screen.

7. The method as claimed in claim 1, further comprising:
   in response to the device identification information associated with the power-on command not matching the stored device identification information associated with the power-off command, transmitting information that instant booting is not possible, to the control apparatus.

8. The method as claimed in claim 1, wherein the device identification information of the control apparatus, which transmits the power-on command, includes at least one among an ID of a Bluetooth remote controller and a media access control (MAC) address of a mobile device.

9. A display apparatus comprising:
a display configured to display an image content;
an input unit configured to receive, from a control apparatus, a power-off command for turning off the display apparatus;
a storage; and
a controller configured to:
control the storage to store image content information about an image content which is displayed on the display apparatus at a time at which the power-off command is input, and device identification information of a control apparatus which transmits the power-off command to the display apparatus,
in response to a power-on command being input, determine whether the device identification information of the control apparatus, which transmits the power-on command to the display apparatus, matches the stored device identification information;
in response to the device identification information associated with the power-on command matching the stored device identification information associated with the power-off command, control the display to display an image based on the stored image content information, and
in response to the device identification information associated with the power-on command not matching the stored device identification information associated with the power-off command, control the display to display an image corresponding to a predetermined content.

10. The apparatus as claimed in claim 9, wherein the control apparatus is a Bluetooth remote controller, and
the controller determines whether a unique ID of the Bluetooth remote controller or information regarding a connected channel when the Bluetooth remote controller is paired with the display apparatus is consistent with the stored device identification information.

11. The apparatus as claimed in claim 10, wherein the controller controls to transmit instant boot information regarding whether instant booting is to be performed, to the Bluetooth remote controller according to a result of the determination, and
in response to receiving the instant boot information, the Bluetooth remote controller outputs a first indicator if the instant booting is performed and a second indicator if the instant booting is not performed.

12. The apparatus as claimed in claim 9, wherein the control apparatus is a mobile device, and
the controller determines whether unique information of the mobile device is consistent with the stored device identification information.

13. The apparatus as claimed in claim 9, wherein the control apparatus is a remote controller which outputs a certain frequency when an input of a power button included in the control apparatus is received, and
the controller determines whether the output frequency is consistent with the stored device identification information.

14. The apparatus as claimed in claim 9, wherein the controller, in response to the device identification information associated with the power-on command not matching the stored device identification information associated with the power-off command, controls the display to display a predetermined screen.

15. The apparatus as claimed in claim 9, wherein the controller, in response to the device identification information associated with the power-on command not matching the stored device identification information associated with the power-off command, controls to transmit information that instant booting is not possible, to the control apparatus.

* * * * *